INVENTOR
Charles Walker
BY
ATTORNEY

Feb. 19, 1946.  C. WALKER  2,395,306
CARD SELECTOR MACHINE
Filed April 12, 1944  5 Sheets-Sheet 2

INVENTOR
Charles Walker
BY
ATTORNEY

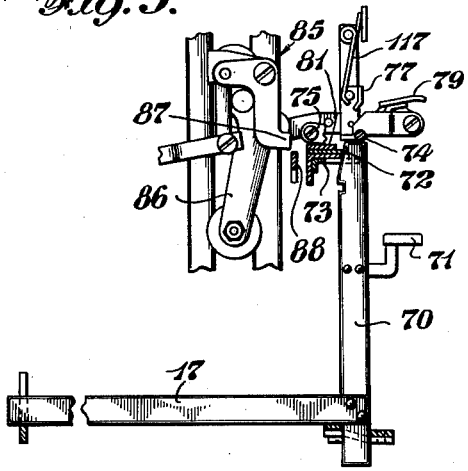
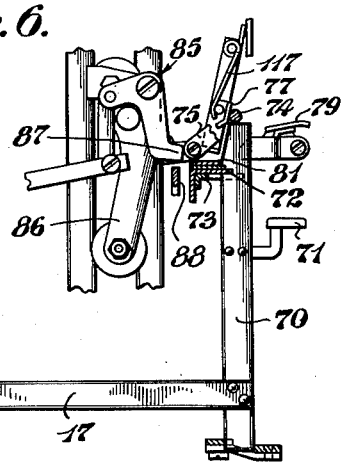
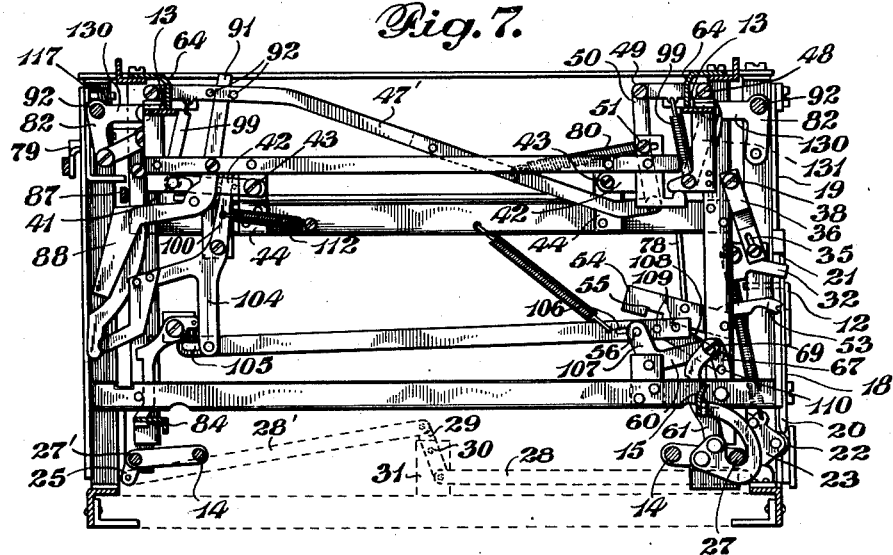
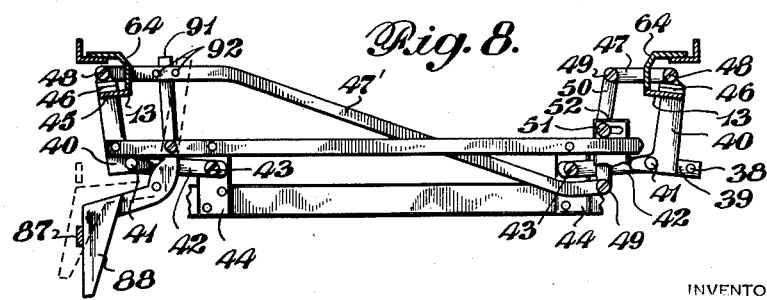

INVENTOR:
Charles Walker
BY
ATTORNEY

Feb. 19, 1946.   C. WALKER   2,395,306
CARD SELECTOR MACHINE
Filed April 12, 1944   5 Sheets-Sheet 5

Inventor
Charles Walker
By
Attorney

Patented Feb. 19, 1946

2,395,306

UNITED STATES PATENT OFFICE 2,395,306

CARD SELECTOR MACHINE

Charles Walker, Syracuse, N. Y.

Application April 12, 1944, Serial No. 530,716

12 Claims. (Cl. 129—16.1)

This invention relates to card selector machines which are designed to pick out from a number of cards, that card or cards having information on items including a specific characteristic or combination of characteristics selected by the operator.

There are in the art a number of devices to perform somewhat similar functions in accordance with various systems which are more or less complicated.

The object of the present invention is to produce a machine that will be simple to operate and will enable the operator to simultaneously pull out all of the cards in a series or file of any total number of information cards, which include some specific characteristic or combination of characteristics, as desired.

A further object is to construct a machine accommodating any total number of cards each covering detail information on a specific one of said number of items of the same general class, for which the machine is used and having means for instantly selecting all those cards which describe items having one or more common characteristics.

A further object is to provide a card case, containing a complete series of cards each of which discloses one of a group of items of the same class, such as airplanes, ships, tanks, etc., with means for instantly withdrawing all cards disclosing those items having one or more common features that may be selected by the operator.

Other and more specific objects of this invention will become apparent as the description of one illustrative example of the device proceeds, with reference to the accompanying drawings in which:

Fig. 5 is a portion of the mechanism showing a key and card rail assembly and a portion of the main lever in their normal inoperative positions;

Fig. 6 is a view of the same mechanism with the key and card rail unit raised over the fixed catch rail and the main lever slightly depressed on its way down during the operating movement;

Fig. 7 is a rear view of the mechanism immediately in front of the card space;

Fig. 8 is a portion of this mechanism which operates the slidable knife assembly, showing the main operating lever down in a position for holding the knives withdrawn;

Figure 3:
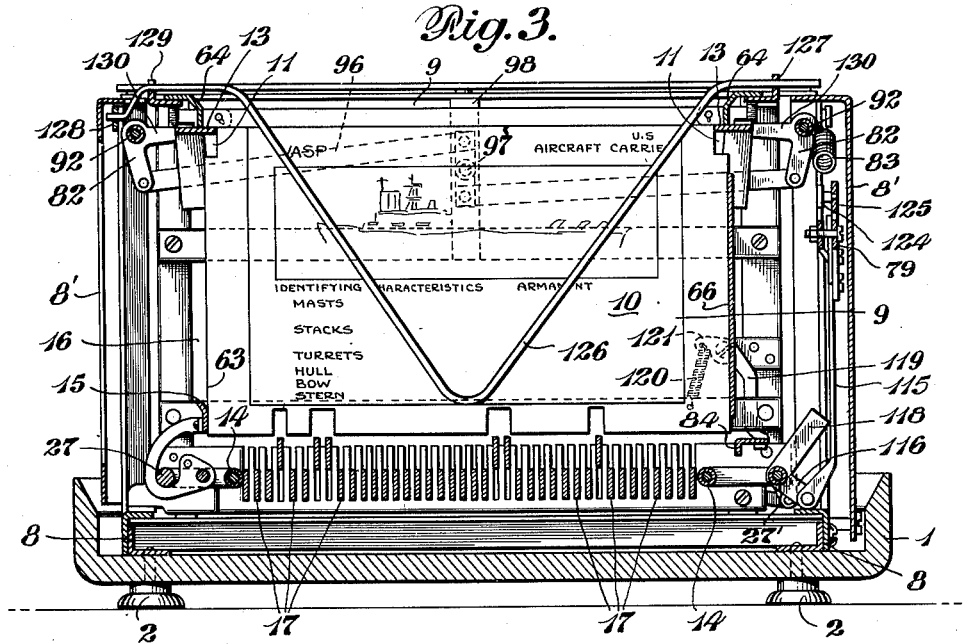
Fig. 3 is a sectional view taken along section line 3—3 of Fig. 2, showing one of the cards of a series describing battleships, which are used for the purpose of illustration in the present embodiment of the device.
Figure 4:
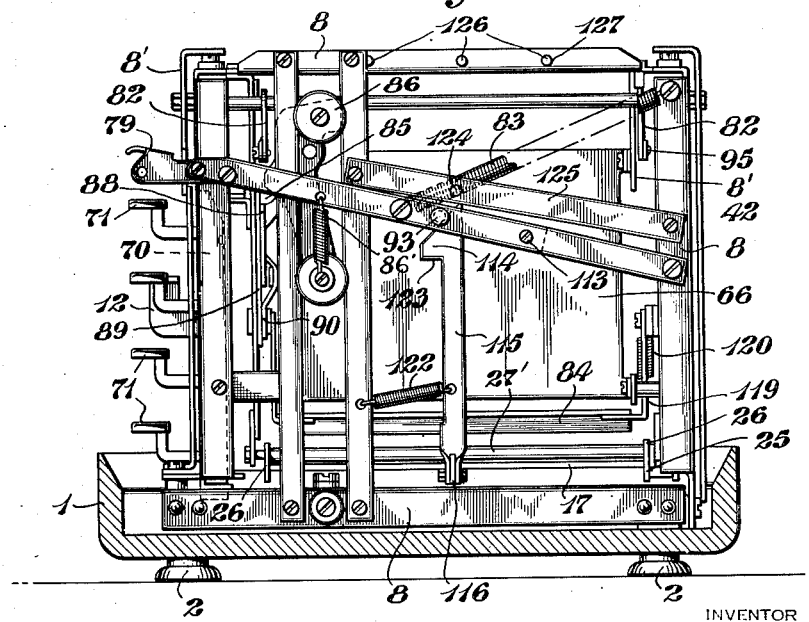
Fig. 4 is an end view taken from the right end of Fig. 3, with end plate removed.
Figure 10:
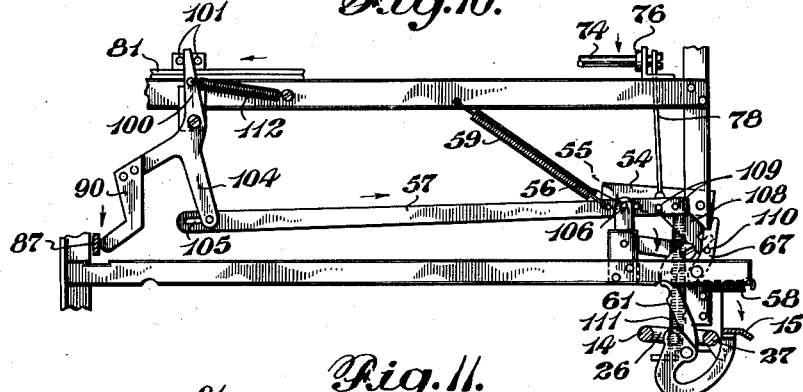
Figure 11:
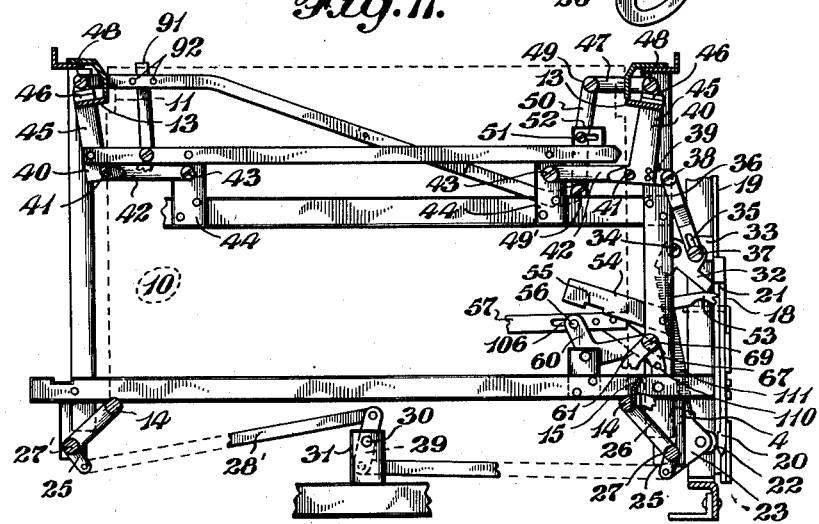
Figure 12:
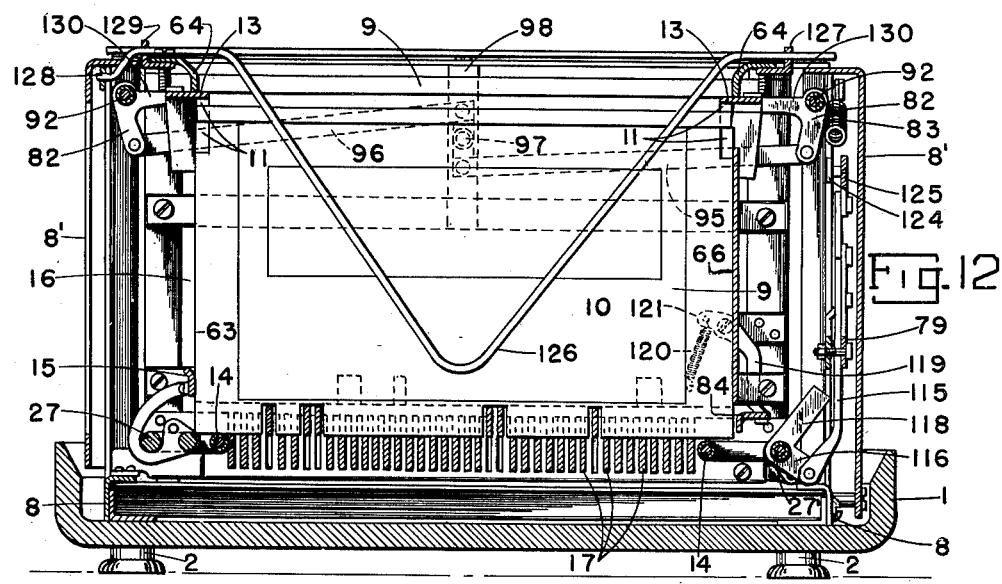
Figure 13:
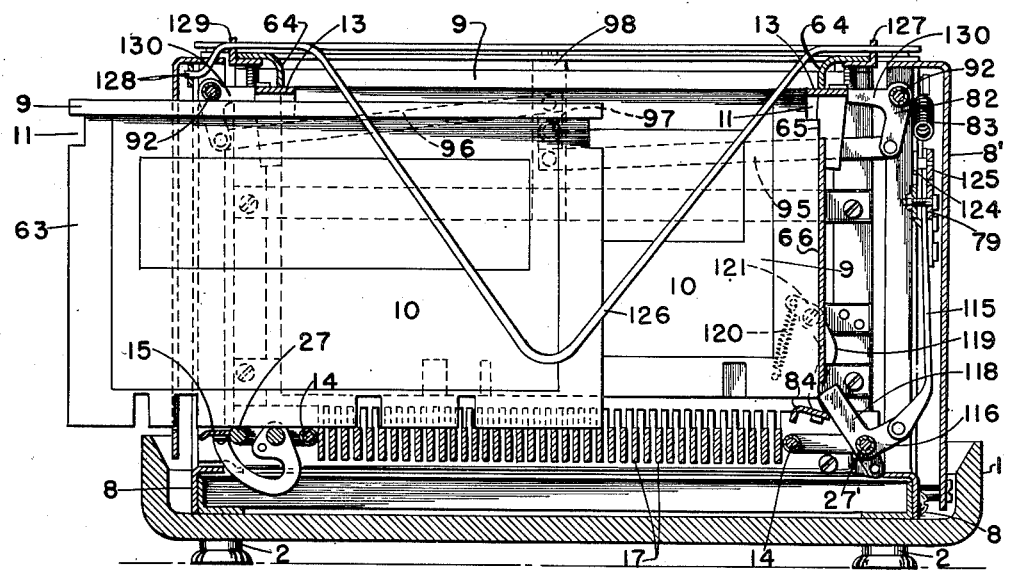
Figure 14:
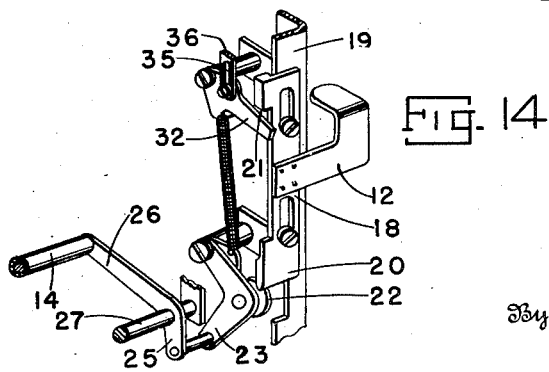

Fig. 10 is a portion of the same mechanism with the main lever still further down where it engages the lock releasing mechanism for lowering the card and guard rail, Fig. 11 shows that portion of the mechanism operated by the loading key for bringing the end rails up to card supporting position while withdrawing the knives to permit insertion or removal of cards in the card space and locking the guard rail in operative position, Figs. 12 and 13 are similar to Fig. 3, but show the mechanism in further advanced steps in the selecting operation, and Fig. 14 shows a detail view of the loading key mechanism as seen from the side of the machine.

Similar parts in the several views and figures of the drawings are designated by like numerals.

The general functions and operation of the machine will be first defined and then the operating mechanism will be described in detail.

A descriptive card is made out for each of a series of items of any general class, such as for example, known existing foreign and domestic war ships, as in the present instance. The cards, being notched in a predetermined manner, in accordance with the features included in the items described, are all loaded or placed in the card space of the machine in any arbitrary order. The loading key is then raised and the machine is ready for operation.

When it is desired to pick out all the cards in the machine describing items having one or more of a series of most discernible features, as it would be, for example, in the process of identification of a destroyer or battleship observed at such distance that only a limited number of features thereof can be distinguished and its identity cannot be immediately established, such cards may be promptly selected and drawn out from this whole series, by the aid of this machine, and may then be examined for further and more definite features to be sought in identifying the vessel observed. Thus it may be more promptly determined whether it is an enemy or a friendly vessel and its identity may be more accurately and quickly established.

The above selection of the cards is made as follows: as many of the specific features as can be seen at first sight are immediately registered on the keyboard by tripping the keys on the machine which are designated by those features, and the main operating lever is then depressed and released, whereupon the desired cards are ejected to one side into an open space in the machine for easy withdrawal, after the manual withdrawal of which the machine is ready for operation to select any other cards out of the remainder, having ships with any other desirable combination of features. The ejected cards, after having served their purpose, may be replaced in any order into the card space with the rest of the cards, by lowering the load key during their insertion, then raising it to put the machine in readiness for another selecting operation.

Referring now to the figures in the drawings, which disclose this specific form of my invention for purposes of illustration; the machine is rigidly mounted in a tray 1 having padded feet 2 at the four corners thereof, and a latch pin 3 at each end. This tray forms the bottom of a carrying case for the machine as well as a support pad for placing the machine on a desk or other suitable surface and operating it without injury to the surface. The top box-like portion 5 of the carrying case fits over the machine and has a handle strip 6 on top and latches 7 at the ends on the bottom edge to lock over the latch pins 3 on the tray. The edges of this box-like portion and the tray portion match and thus form a complete enclosure for the machine, so that it may be stored or safely carried around. Obviously, a lock or locks may be provided for this enclosure to prevent tampering by unauthorized persons.

The machine itself has a rigid frame structure 8 to which the various moving parts are attached and in which the card space 9 is formed. The cards 10, which are all uniformly notched at 11 at their sides near the top, are placed in the card space while the load key 12 is depressed. Depressing this key withdraws the knife blades 13 and raises the end rails 14, while at the same time the guide rail 15 for the open end 16 of the card space is lifted into operative position if it has not previously been moved into this position. When the cards are in place, the loading key 12 is raised. This operation of the key 12 first releases the knife blades 13 which enter the notches 11 near the top of the cards and then lowers the end rails 14 to the level of the key rails 17 in their inoperative position. Thus the cards are all in hanging position on the knife blades so that their bottom edges are spaced above the level of the key rails 17 in their inoperative positions.

The mechanism whereby this loading operation is performed is shown in detail in Figs. 7 to 11. The loading key 12 is mounted on a cam plate 18 slidably mounted on the vertical frame member 19 of the machine. This cam-plate has two cams 20 and 21. During the depressing movement of the load key, the lower cam 20 acts on the roller 22 of the lever 23 to bring the end rails 14 up into their raised position first.

This is done through the linkage comprising the connection of the lever 23, which is pivoted to the frame at 4, to the short arm 25 of the bell crank 26 on one end of the shaft 27 which carries a similar bell crank at its other end. The long arms of these bell cranks 26 are rigidly attached to the ends of the end rail 14. A similar bell crank and end rail assembly is mounted for oscillation with a shaft 27' at the other end of the machine and the two end rail asesmblies are linked to operate simultaneously through the links 28 and 28' connected at their outer ends to the short arm 25 of a bell crank 26 on each of the end rail assemblies, and at their other ends to the opposite ends of the lever 29 pivotally mounted at its center 30 on the frame member 31.

Further downward movement of the loading key and the cam plate brings the other cam 21 into contact with the lever 32 pivotally mounted on the frame member 33 at 34. This lever is pivotally connected through a pin and slot connection 35 to a link 36 at 37, the other end 38 of this link being connected to the horizontal arm 39 of a bell crank 40, mounted on an oscillatable pivot 41 on the arm 42, which is pivoted at its other end 43 on the frame member 44. A similar arm 42 is pivoted at the rear of the machine frame and has a similar oscillatable pivot 41 on which another bell crank 40 is likewise mounted and the two bell cranks have vertical arms 45 to the upper ends 46 of which a knife blade 13 is rigidly attached. A complementary knife blade mechanism is mounted at the other end of the machine frame, the two mechanisms being connected to operate in unison to retract the blades 13 through links 47 and 47', connected at their outer ends to the upper ends 48 of the vertical arms 45 and their other ends being connected to opposite arms 49 and 49' of lever 50 pivoted at its center 51 to the frame member 52.

Cam 21 also strikes arm 53 on latch member 54, thus raising the latch pawl 55 off of pin 56 on link 57, releasing link 57 so it moves to the left in response to action of the spring 59. This operates the bell crank 60 and link 61 to bring the end guide member 15 into position to guide the ends 63 of the cards and keep them from slipping off the guide rails while the knife blades at the top are retracted from the card notches, the tops of the cards being guided at the same time by the rail members 64 under which the knife blades work, and the other ends 65 of the cards being also guided by fixed guide plate 66. Locking lever 67 slips under a pin at the pivot 69 to lock the guide rail 15 in position until it is moved out of the way by operation of the link 57 in reverse direction as explained hereinafter. Spring 58 normally retains the locking lever in locking position.

When the loading key is raised after the cards are loaded, the reverse operation of the cams 20 and 21 first releases the knife blades so that they reenter the notches at the top of the cards and then lowers the end rails allowing the cards to hang freely on the knife blades.

The selecting operation of the machine is controlled and performed as follows:

Each card rail and key unit 17—70—71 is guided for vertical movement. Upon raising any key 71, the corresponding unit is raised as a whole until the notch near the upper end of its vertical member 70 springs over the forward edge 72 of the fixed catch rail 73. This simultaneously swings the lock bar 74 which is positioned over the tops of all the vertical members 70 and has a pair of spaced parallel arms 75, 76 pivoted to the frame. One end of the lock bar 74 contacts and releases the main lever lock 77 and the lock bar also has a link 78 at its other end pivoted to arm 76, connecting it to the latch member 54 through a lost motion connection 62 for raising the latch pawl 55 off the pin 56 on link 57, if it hasn't been previously lifted by operation of the loading key, thus bringing the guide rail 15 up into guiding position. Any number of other keys may be lifted to spring the notches of the corresponding rail and key units over the fixed catch rail 73, as may be desired. Now the main lever 79 is ready for operation. Its downward movement produces a series of operating steps whereby the knife blades 13 are first retracted, then lowered slightly, then released so that the spring 80 causes them to reenter the notches 11 of all those cards still remaining at the original level, being supported by one or more of the raised card rails 17, while the cards having slots at their bottom edges over all the raised card rails have in the meantime dropped to a level where they are supported only by the unraised card rails. Then the guide rail 15 is lowered out of the way of these latter cards at the open end of the card space, the release bar 81 is moved to release all the keys and restore the lock bar 74, and the knife blades are raised slightly to their original position up against the guide members 64 and the link 57 is locked with the guide rail down.

The upward movement of the main lever 79 is performed by the main spring 83 upon release of the lever. During this movement the abutment member 84 is swung against the ends of any cards that may be in the lowered position and pushes them out toward the open end of the card space. When the lever 79 reaches its upper limit it is automatically hooked by the lock 77.

These main lever operations are performed by the aid of a series of levers actuated by the main lever either directly or through a cam means 85 mounted on a carriage 86 guided for vertical motion in response to the lever movement. A lost motion connection between the main lever and the carriage first moves the cam lever 87 into the plane of levers 88, 89 and 90, and then moves it vertically downward with the carriage so as to intercept first the lever 88. The spring 86' is for taking up this lost motion by holding up the carriage until the main lever has moved the cam lever 87 into position. When lever 87 intercepts the lever 88 this lever in turn operates the knife blade retracting means by means of its arm 91 sliding between a pair of guide pins 92' on link 47'. The next lever intercepted is 89, which lowers the knife blades while in their retracted position.

This lowering operation is made possible by reason of the pivotal mounting of the knife blade assemblies on bell cranks 82, attached to shafts 92. The upper end of lever 89 is linked to the downwardly extending arm 94 of the bell crank 82 on the right side of the machine at the front. The downwardly extending arms of the bell cranks at the rear of the shafts are linked for simultaneous complementary operation by means of the links 95 and 96 and lever 97, as shown, the lever 97 being pivoted on the frame member 98. The springs 99 at the four corners of the machine urge the blade assemblies upwardly against the guide rails. The horizontal arms 130 of bell cranks 82 are connected by links 131 to the pivots 41 for lowering the blade assemblies against the force of springs 99.

While the blades are still maintained in their lowered position the cam lever 87 slips off the end of lever 88 and spring 80 restores the blades to their projecting position. The springs 99 restore the blades to their normal elevation against the guide rails 64, when the cam lever 87 moves down off the end of lever 89.

Figure 1:
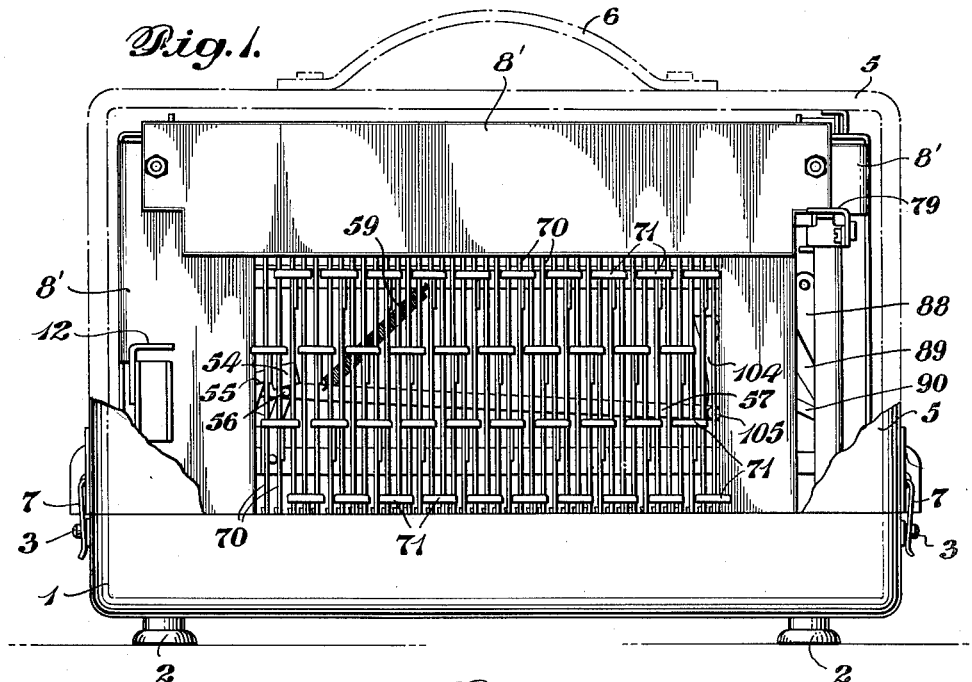
Fig. 1 is a front view of a preferred form of the device, adapted in the present embodiment for selecting cards in accordance with up to forty different characteristics of the items in the class covered, a portion of the top of the carrying case being broken away.
Figure 2:
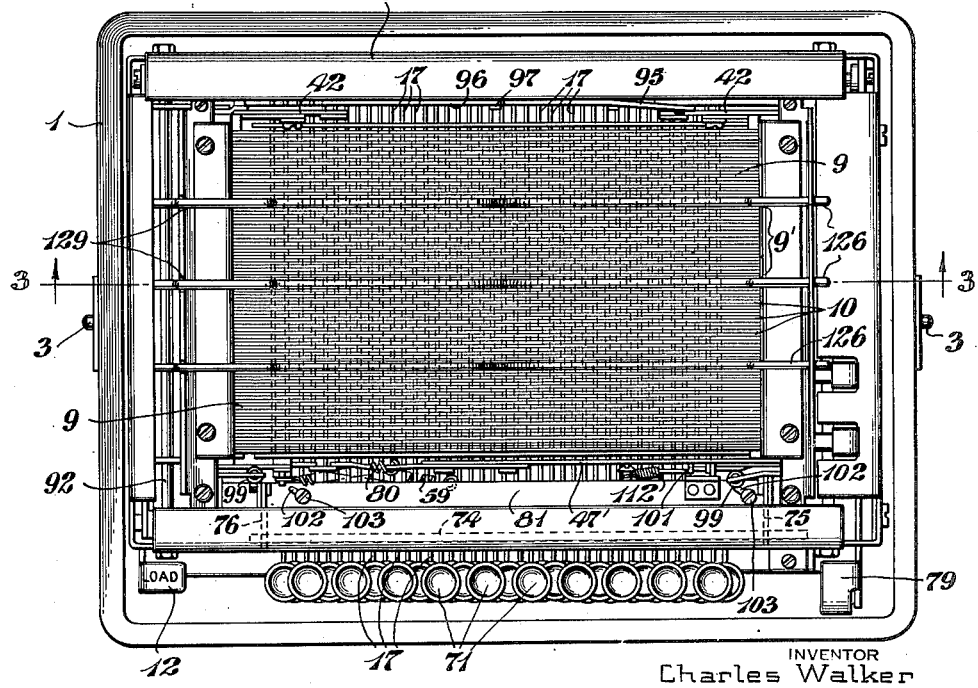
Fig. 2 is a plan view of the machine with the cover removed, showing a series of cards in place in the card space.

In the meantime lever 90 has been intercepted by cam lever 87 and operates through an arm 100 sliding between guide pins 101 on release bar 81 to move it to the right and forward by reason of the diagonal guide slots 102 and pin screws 103 (see Fig. 2). This movement of the release bar 81 pushes any vertical members of the card rail and key units that might be sprung over the edge of the fixed catch rail 73 off of this rail, so that these units all drop by gravity to their inoperative position, simultaneously lowering the lock bar 74 which releases the latch members 77 and 54. In the meantime another arm 104 on lever 90 operating through a pin and slot connection 105 moves the link rod 57 to the left. This rod has another pin and slot connection 106 at the other end with arm 107 of the bell crank 60, previously referred to, for lowering the guide rail 15. The locking lever 67 is pushed out from under the pin at the pivot 69 upon initial movement of the link rod 57 to the left, by the projecting cam member 108 riveted at 109 thereto and acting against a pin 110 on the locking lever 67. When the guide rail has moved out of the way into its lowered position, the latch member 54 drops over the pin 56, which has moved under the notched portion 55 of the latch member 54. Spring 111 urges the latch member down. The spring 112 urges the lever arm 100 to retract the release bar 81 after the cam lever 87 slides down off the end of lever 90. During the upward movement of lever 79, cam lever 87 slides over the backs of levers 90, 89 and 88 without operating them. At the top of its stroke lever 79 is locked by latch 77 which is yieldably urged into locking position by spring 117.

The main lever 79 has a pair of pins 93 and 113 between which a cam and pawl 114 at the top of link 115 operates. The link is hinged at the bottom to one arm of a bell crank 116 pivotally mounted on the shaft 27'. The other arm 118 of the bell crank is oscillatable to strike the ejector bar 84 which is mounted on arms 119 to swing into the lower end of the card space below the level of the cards still hanging on the knife blades but above the bottoms of those that have been dropped for ejection through the open end of the card space. The ejector bar 84 is urged out of the card space by spring 120, mounted on a projection 121 at the pivoted end of one of the arms 119. The link 115 is urged forwardly by spring 122, the pivotal connection of the link being loose enough to permit a limited fore and aft oscillation of the link. As the main lever 79 is pressed down, the pin 93 rides over the bevelled edge of the cam and under the pawl shoulder 123; on its return stroke the pin 93 picks up the pawl shoulder 123 and pulls the link 115 up, which causes arm 118 of bell crank 116 to strike the ejector bar 84 to eject the lowered cards, while the bevelled cam surface is acted upon by a stationary pin 124 on frame member 125 to push the pawl shoulder 123 off the pin 93 on the main arm until the link is released and drops down to its inoperative position.

The card notches and blades and card rails are designed so as to permit a limited amount of misalignment of the cards in the card space from a strictly upright and squared position. However, to keep the cards from getting too far out of alignment during the loading operation, a series of guide wires 126, may be used to separate the card space 9 into smaller sections 9' in which even a single card might be kept from being cocked too much out of position for proper operation of the knife blades into the card support notches. These wires may be clipped into position in holes 127 in the frame at one end and into holes 128 and slots 129 at the other end to keep them vertically positioned.

In the present form of machine, closure or cover plates 8' are fitted around the machine except for the keyboard and operating lever and loading key and the openings at the top and left end of the card space to provide for loading and ejection of the cards respectively. This not only improves the appearance of the machine but prevents accidental injury to the moving parts of the mechanism.

Figure 9:
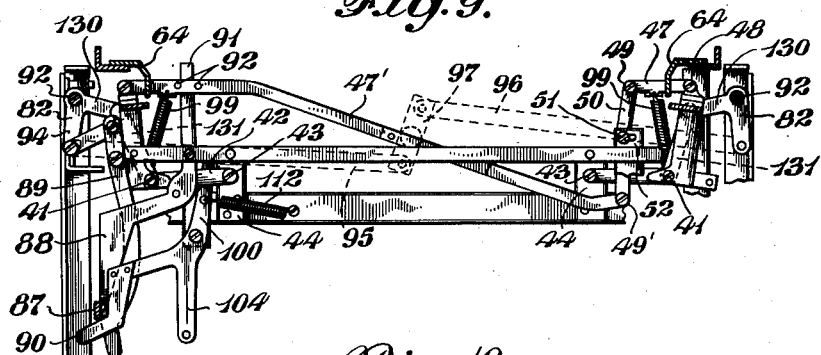
Fig. 9 shows a little more of this mechanism with the main lever down a little further where it engages the knife assembly lowering mechanism.

Fig. 12 shows some of the cards having been dropped and corresponds to the position of the controls after the operating lever has reached the end of its downstroke following the steps in the cycle of operations as shown progressively in Figs. 8, 9 and 10, after the knife blades have been returned to their normal inward positions in the card notches of the cards remaining at the upper level.

Fig. 13 shows the result of the return movement of the operating lever 79 after it has completed a full downward stroke.

Broadly then, the present machine provides a means operated as follows, to select all those description cards from a pack, which describe items having one or any combination of characteristics desired:

After the machine is properly loaded and set for a selecting operation, the operator pulls up the key or keys which correspond to the desired characteristics. These keys once pulled up remain latched in their raised position until the operating lever is fully depressed, whereupon the keys are automatically returned to inoperative position. The operating lever is then fully depressed and released whereupon it returns to its original position. In the process of operating the lever downwardly the knife blades are caused to withdraw from their normal card supporting position; the properly selected cards drop to a lower level as a result of their notches matching all the raised card rails, the remaining cards being held in their raised position by one or more of the raised card rails; the knife blades are lowered slightly, moved inwardly into the side notches at the tops of the cards remaining in the raised position, and then raised slightly, back to their original card supporting position; the guide rail is dropped out of the way; and the raised card rail and key units are released and drop to their normal lower level simultaneously releasing the main lever locking latch. Upon its release, the main operating lever is returned to its uppermost position by the main spring, and is locked by the latch which was released upon dropping of the rail and key units. On its way up the main operating lever causes the ejecting bar to strike the lowered cards sideways and these cards are shifted so that they extend into the ejecting space to one side of the frame, where they can be grasped and manually removed from the machine for inspection.

Operation of the loading key then permits reinsertion of the removed cards or any additional cards into the card chamber with the rest of the cards.

Obviously, many modifications in the specific arrangement and form of parts as well as size of the card space may be made to accommodate any number of cards and to suit specific requirements, without departing from the scope of the present invention, which is defined in the appended claims.

The specific improvements included in the device herein disclosed, which comprise my invention, are defined in the appended claims.

What is claimed is:

1. In a selector comprising a frame adapted to receive a plurality of edge-notched sheets, selecting elements mounted in said frame, releasable supporting means for said sheets, and an operating member for actuating said supporting means for effecting release of certain of said sheets; latch means for normally locking said operating member in inoperative position, and means actuated by movement of said selecting elements for unlatching said operating member.

2. In a selector comprising a frame adapted to receive a plurality of edge-notched sheets, selecting elements mounted in said frame adapted to cooperate with the notches in said sheets, releasable supporting means for said sheets, and an operating element for actuating said supporting means for effecting release of certain of said sheets from said frame; retractable inwardly projecting elements normally additionally supporting said sheets, and means actuated by said operating element for retracting, lowering and restoring said retractable elements to their inwardly projecting positions.

3. In a selector comprising a frame adapted to receive a plurality of edge-notched sheets, and selecting elements mounted in said frame adapted to cooperate with the notches in said sheets; means for normally supporting said sheets at opposed side edges, substitute means formed by raising any of the selecting elements for supporting the unselected sheets from the bottom, vertically disposed removable guide means for alignment of the edges of said sheets, and means for simultaneously lowering said substitute supporting means and removing said guide means.

4. In a selector comprising a frame adapted to receive a plurality of edge-notched sheets, and selecting elements mounted in said frame adapted to cooperate with the notches in said sheets; means for normally supporting said sheets at opposed side edges, temporary supporting means for the unselected sheets formed by said selecting elements when raised to the bottom edges thereof, removable means for guiding the side edges of said sheets in vertical alignment, and means for simultaneously raising said temporary means and bringing said guiding means into operative position.

5. In a selector comprising a frame, opposed retractable supporting elements adapted to receive a plurality of edge-notched sheets, removable vertical guide means for the side edges of said sheets, selecting elements mounted in said frame adapted to cooperate with the notches in the bottom edges of said sheets and operative by being raised to the bottom of the sheets, means to bring said guide means into operative position, and an operating element for retracting said supporting elements for effecting release of certain of said sheets which have notches over each of said raised selecting elements; means engaged upon movement of said operating element in one direction after retracting said supporting elements, for lowering said supporting elements, projecting said supporting elements, then restoring said selecting elements and said guide means to their inoperative positions and said supporting elements to their normal raised positions.

6. In a card selector machine having a frame, a pack of vertically disposed cards therein, a narrow slot in the bottom of each card positioned therealong for each feature contained in the data on said card in accordance with a predetermined relation between positions and features, a pair of knife blades at the sides of the cards near their top edges, means for hanging said cards thereon, a series of parallel transverse rails under said pack at a normal level below the bottoms of the cards in their hanging position, each rail corresponding to a position designated for one feature, means for raising said rails selectively to the level of said cards, vertical guide means for the sides of the cards, and means for withdrawing the knife blades and causing those cards which have a slot corresponding to each of the raised rails to drop to the lower level; means for slightly dropping the knife blades and returning them to their operative position for grasping those cards which have not dropped, means for returning all the raised transverse rails to their normal level, means for removing the portion of the vertical card guide at one side of the lowered cards, means for moving the lowered cards to that side of the pack by pushing them from the other side at a level below the raised cards, and an operating means for actuating all said means in the order above enumerated.

7. In a card selector machine having a frame, a pack of vertically disposed cards therein, a narrow slot in the bottom of each card positioned therealong for each feature contained in the data on said card in accordance with a predetermined relation between positions and features, a pair of knife blades at the sides of the cards near their top edges, means for hanging said cards thereon, a series of parallel transverse rails under said pack at a normal level below the bottoms of the cards in their hanging position, each rail corresponding to a position designated for one feature, means for raising said rails selectively to the level of said cards, and vertical guide means for the sides of the cards; means for withdrawing the knife blades and causing those cards which have a slot corresponding to each of the raised rails to drop to the lower level, means for returning them to their operative position for grasping those cards which have not dropped, means for returning all the raised transverse rails to their normal level, means for removing the portion of the vertical card guide at one side of the lowered cards, means for moving the lowered cards to that side of the pack by pushing them from the other side at a level below the raised cards, and an operating means for actuating all said means in the order above enumerated.

8. In a card selector machine having a frame with a card compartment, a series of cards therein containing data on different items and arranged in an arbitrary order, said cards having aligned notches at their sides near the tops, and slots in their bottom edges spaced along the edge at positions corresponding to all the pertinent features contained in the data on each card respectively, in accordance with a predetermined relation between the positions and features, a pair of knife blades slidable into the notches at the sides of the cards, a pair of transverse end rails for holding the cards up at a level where the knife blades may be slid into or out of the notches, a number of parallel transverse rails at a level below the bottoms of the cards when they are hung on the knife blades, each rail corresponding to one of the possible features that might be included in the data on the various cards and positioned accordingly, means for sliding the knife blades into the notches and then lowering the end rails to the level of the other transverse rails in their normal lowered positions, key means for raising one or more selected rails to the bottoms of the hanging cards, and vertical guide means for the sides of the cards; means for then withdrawing the knife blades thus causing the cards that have slots corresponding to all the raised rails to drop to the lower level on the unraised rails while the rest of the cards remain in the hanging level, means for slightly lowering the knife blades then sliding them inwardly into the notches of the raised cards above the tops of the lowered cards and bring the knife blades back up to their original positions, means for then removing the portion of the card guide means holding the lowered cards from one side, means for then ejecting these cards through that side by pushing them from the other side at a level below the bottoms of the hanging cards for manual removal from the machine, and a common operating means for actuating the above means in sequence as stated.

9. In a card selector machine having a frame with a card compartment, a series of cards therein containing data on different items and arranged in an arbitrary order, said cards having aligned notches at their sides near the tops, and slots in their bottom edges spaced along the edge at positions corresponding to all the pertinent features contained in the data on each card respectively, in accordance with a predetermined relation between the positions and features, a pair of knife blades slidable into the notches at the sides of the cards, a pair of transverse end rails for holding the cards up at a level where the knife blades may be slid into or out of the notches, a number of parallel transverse rails at a level below the bottoms of the cards when they are hung on the knife blades, each rail corresponding to one of the possible features that might be included in the data on the various cards and positioned accordingly, means for sliding the knife blades into the notches and then lowering the end rails to the level of the other transverse rails in their normal lowered positions, key means for raising one or more selected rails to the bottoms of the hanging cards, and vertical guide means for the sides of the cards; means for then withdrawing the knife blades thus causing the cards that have slots corresponding to all the raised rails to drop to the lower level on the unraised rails while the rest of the cards remain in the hanging level, means for slightly lowering the knife blades then sliding them inwardly into the notches of the raised cards above the tops of the lowered cards and bringing the knife blades back up to their original positions, means for then removing the portion of the card guide means holding the lowered cards from one side, means for then ejecting these cards through that side by pushing them from the other side at a level below the bottoms of the hanging cards for manual removal from the machine, a common operating means for actuating the above means in sequence as stated, and means for automatically locking said operating means to prevent its operation unless one or more of the feature rails have been raised, so as to prevent inadvertent ejection of all the cards.

10. In a card selector machine, a frame having a card compartment, a series of cards therein containing data on different items and arranged in an arbitrary order, said cards having aligned notches at their sides near the tops, a pair of knife blades slidable into the notches at the sides of the cards, a pair of transverse end rails for holding the cards up at a level where the knife blades may be slid into or out of the notches, control means operated in one direction for sliding the knife blades into the notches and then lowering the end rails preparatory to a selecting operation, and operated in the other direction for raising the end rails and then withdrawing the knife blades whenever it is desired to load the machine or to insert any additional cards thereinto.

11. In a selector comprising a frame adapted to receive a plurality of edge-notched sheets, selecting elements mounted in said frame adapted to cooperate with the notches in said sheets, releasable supporting means for said sheets, and an operating member for actuating said supporting means for effecting release of certain of said sheets; latch means for normally locking said operating member in inoperative position, and means actuated in response to the operation of any one of the selecting elements for rendering said member operable by unlocking said latch means.

12. In a selector comprising a frame adapted to receive a plurality of edge-notched sheets, selecting elements mounted in said frame adapted to cooperate with the notches in said sheets, a releasable supporting means for said sheets and an operating element for actuating said supporting means for effecting release of certain of said sheets from said frame; retractable elements normally additionally supporting said sheets, and means actuated by said operating element for retracting, lowering, projecting, and raising said retractable elements back to their normal positions.

CHARLES WALKER.